Sept. 12, 1944.   O. W. PINEO   2,358,097
SPECTROPHOTOMETER ANTIBACKLASH REDUCTION DRIVE
Filed April 29, 1942   3 Sheets-Sheet 1
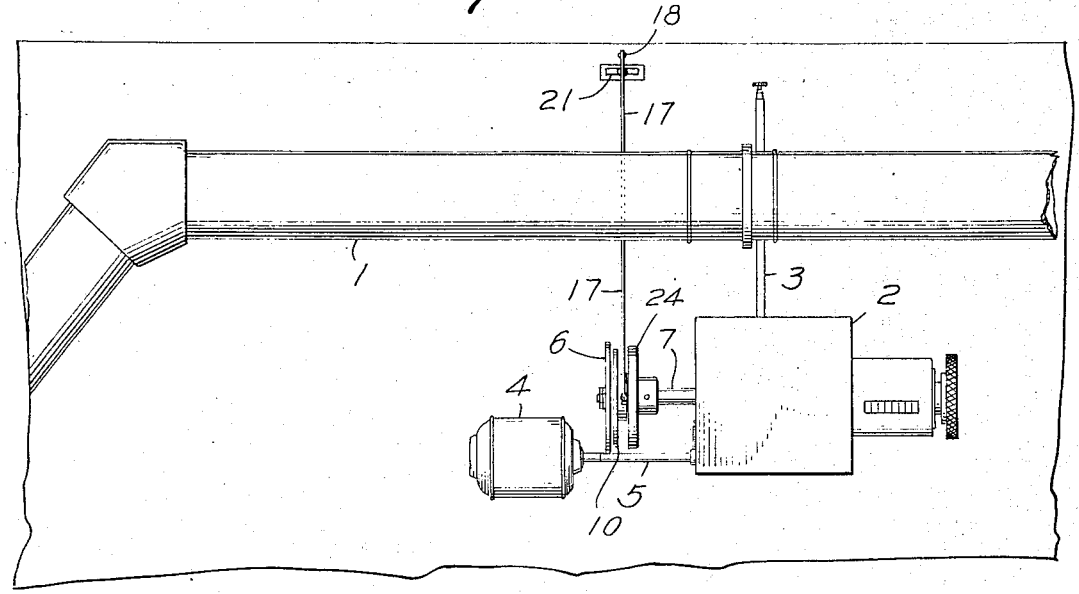
Fig. 1.
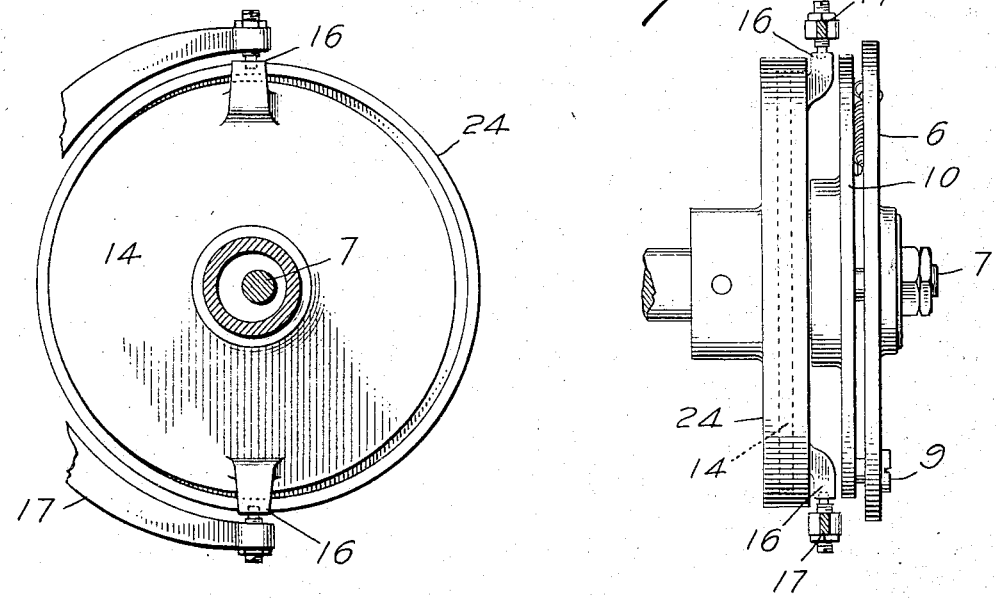
Fig. 5.
Fig. 6.
INVENTOR
ORRIN WESTON PINEO,
BY Robert Ames Norton
ATTORNEY.

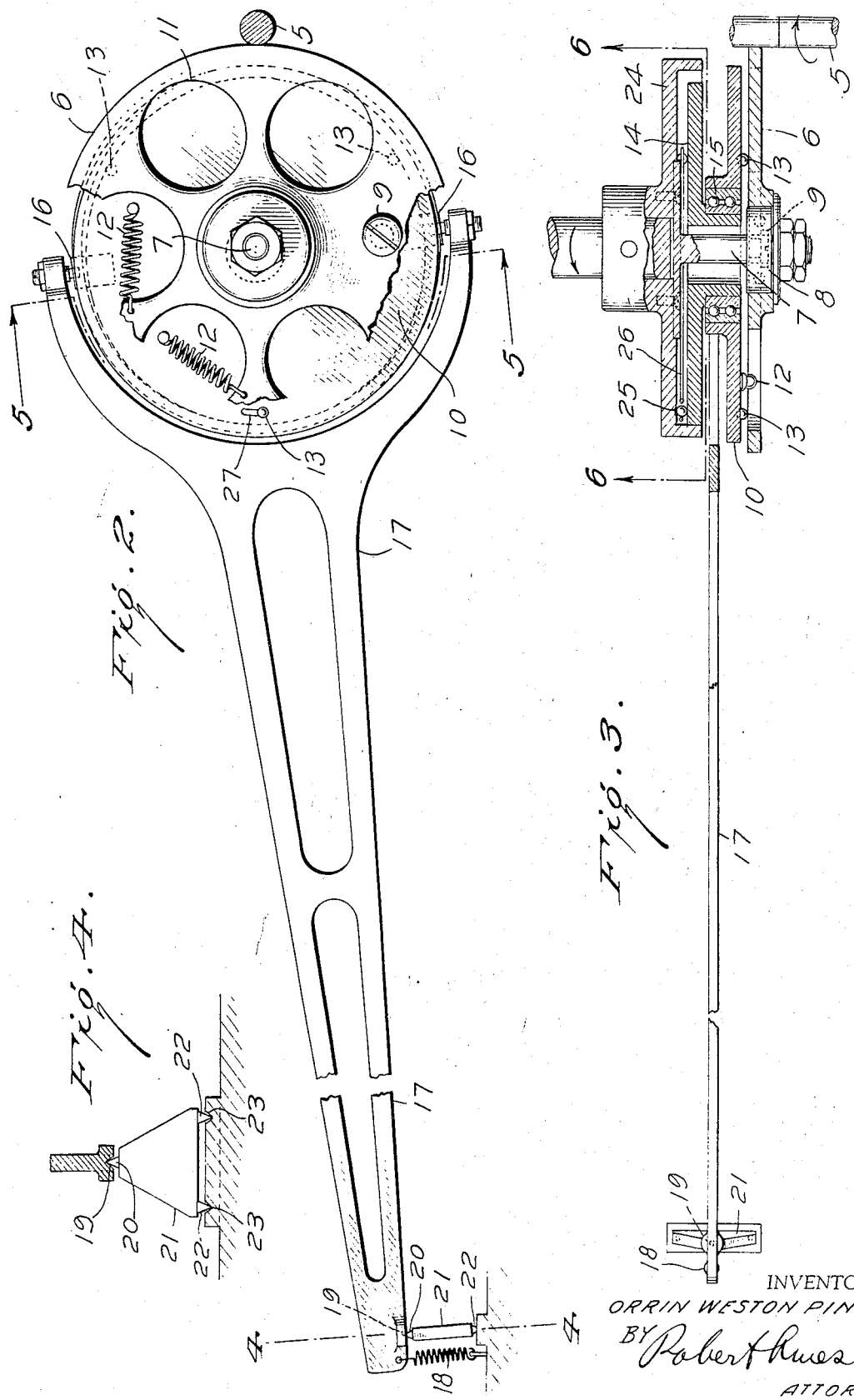

Sept. 12, 1944.  O. W. PINEO  2,358,097
SPECTROPHOTOMETER ANTIBACKLASH REDUCTION DRIVE
Filed April 29, 1942   3 Sheets-Sheet 3
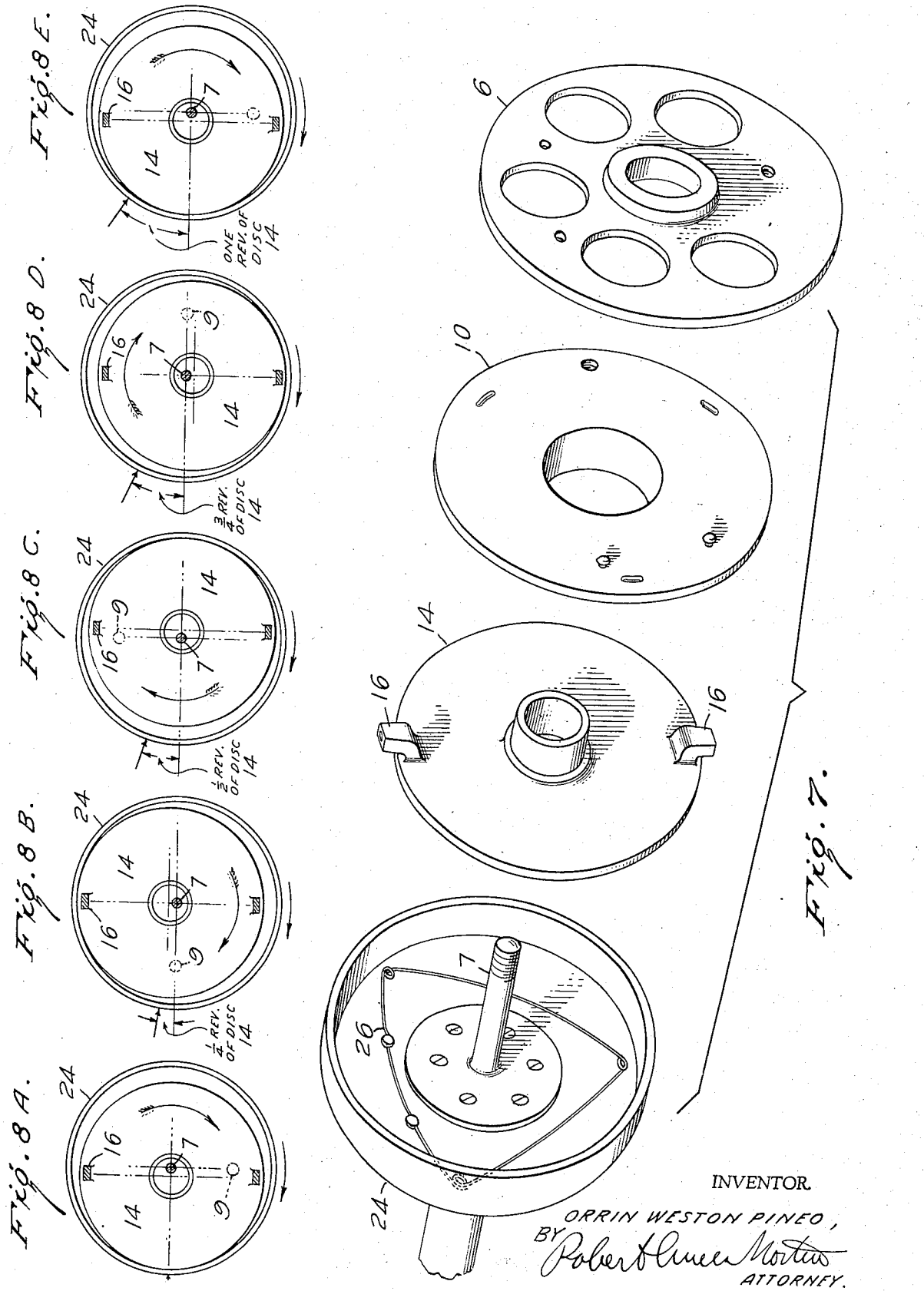
INVENTOR.
ORRIN WESTON PINEO,
BY
ATTORNEY.

Patented Sept. 12, 1944

2,358,097

UNITED STATES PATENT OFFICE 2,358,097

SPECTROPHOTOMETER ANTIBACKLASH REDUCTION DRIVE

Orrin Weston Pineo, Milo, Maine, assignor to American Cyanamid Company, New York, N. Y., a corporation of Maine Application April 29, 1942, Serial No. 441,030

2 Claims. (Cl. 74—309)

This invention relates to speed reducers having no backlash, and more particularly to such reducers applied to the drive of photometering elements in flickering beam spectrophotometers.

There is a considerable need for speed reducers effecting a very great reduction without any backlash for use in certain drives where there must be no slippage in the drive. One of the applications for such speed reducers is the drive of photometering elements of flickering beam spectrophotometers such as those of the type described in my prior Patent 2,107,836. In such a spectrophotometer, photometering is effected by rotation of a polarizing prism which is driven through high reduction and a suitable cam from an electric motor actuated by electric current from the machine when it is in a state of unbalance. The operation is to rotate the photometering prism until the machine becomes in balance, the amount by which the prism is rotated being a measure of the degree of optical unbalance at any particular instant in the machine. It is necessary, in order to utilize the electric current effectively, that there should be a very high reduction between the motor and the prism because the prism is turned through only about 45°. If there is any backlash between the motor and the prism there will be a tendency for the machine to hunt as the point of balance is approached and in recording spectrophotometers of the type described in my patent, a poor or wavering curve may easily result. Other types of instruments also require a high degree of speed reduction without backlash, and while the present invention will be described below in detail in conjunction with a flickering beam spectrophotometer, and for which it is particularly useful, it should be understood that the drive is applicable also to other types of apparatus.

Essentially the drive may be considered as composed of three elements, two of them concentric to a driven shaft, one being geared thereto and the other journaled thereon, and an intermediate member which is caused to wobble eccentrically about the shaft and to be in constant rolling contact at various portions of the fixed member so that the latter can be driven in the same direction as the journaled member but at a speed which is a differential of the size of the wobbling member and the driven member. In practice the journaled member is normally a disc which can be driven through a friction drive from a motor. The wobbling member is usually also a disc and the driven member is a cup, the inner periphery of which is slightly larger than the outer periphery of the wobbling disc and is in contact therewith.

The operation of the device of the present invention will be more apparent from a detailed description in conjunction with the drawings in which:

Fig. 1 is a plan view of a portion of the spectrophotometer showing an application of the speed reducer of the present invention thereto.

Fig. 2 is an elevation partly broken away of the speed reducing elements of the drive.

Fig. 3 is a plan view partly broken away of the elements of Fig. 2;

Fig. 4 is a vertical section along line 4—4 of Fig. 2;

Fig. 5 is a vertical elevation of some of the parts of Fig. 2 taken at right angles thereto, the view being along the line 5—5;

Fig. 6 is a section along the line 6—6 of Fig. 3;

Fig. 7 is a perspective showing the individual members of the speed reducing elements of Figs. 2, 3, 5 and 6 disassembled; and Figs. 8A–E are diagrammatic sections illustrating the operation of the device through one full cycle of rotation of the driving member.

In Fig. 1 a portion of a flickering beam spectrophotometer is shown at 1, the portion including the exit from the monochromator and the photometering prism which is driven by a push rod 3 operated by cams (not shown) in the housing 2. Drive is effected by the electric motor 4 which drives a shaft 5 engaging a driven member or disc 6 by frictional contact.

The member 6 is journaled on the output shaft 7 by means of a ball bearing 8 (Fig. 3). A second disc 10 is fastened to the disc 6 by a screw pin 9 about which it may move in a small arc. The discs are kept spaced by small balls 13 which move in grooves 27 (see Fig. 2), the grooves being long enough to permit movement through an arc of a few degrees about the pin 9 as a pivot. The center of the disc 10 carries a ball bearing 15 and is journaled on a hub of a third disc 14. This hub is hollow and considerably larger than the shaft 7 and is eccentrically located with respect thereto. On the shaft 7 there is bolted a cup 24 which is kept spaced from the disc 14 by some balls 25 held in wire loop 26. The periphery of the disc 14 is in contact with the inner periphery of the cup 24 at one point about 90° from the pin 9. Two springs 12 connect the portions of the disc 6 to the disc 10 extending through holes 11 in the former and being so positioned that they tend to rotate the disc 10 about the pin 9 in a counterclockwise direction (Fig. 2). The extent of this rotation is limited by the length of the slots 27 and also by the fact that a very small movement will force a portion of the periphery of the disc 14 into contact with the inner periphery of the cup 24.

The disc 14 is provided with two lugs 16 which bolt into a forked arm 17 pivoted on a pin 20 carried by a rocking block 21 which in turn rocks on two points 22 engaging hollows 23 on the framework of the spectrophotometer. A spring 18 presses the arm 17 tightly against the rocking block 21 and keeps the pivot 20 in the depression 19 of the arm. The connection permits the arm 17 to move up and down and also to move sideways.

When the motor 4 starts to turn the shaft 5, this transmits the motion by friction to the disc 6 which in turn carries disc 10 around with it. The latter rotates about the hub of the disc 14 and the tension of the springs 12 tends to rotate the disc 10 about the pin 9. The disc 14 is forced to move also and is kept in contact with the periphery of the cup 24 at a point approximately 90° from the location of the pin 9. Because of the arm 17, disc 14 cannot rotate but moves up and down, its center describing a circle.

The proportion of the clearances so that the disc 14 contacts the cup 24 at approximately 90° from the pin 9 represents some advantages because pull of the springs acts more or less at right angles to the periphery of the cup 24 at point of contact. As a result there is but little if any wedging action and hence the degree of friction is substantially the same in either direction of rotation. It is thus possible by choosing suitable spring dimension to have a frictional contact which will not slip under ordinary operation but which is not so great as to prevent turning the cup 24 manually. This permits moving the cup 24 and its shaft for purposes of shifting cams or restarting a measuring cycle without disconnecting any portions of the drive and even without requiring the motor 4 to be stopped. This is of considerable advantage in a spectrophotometer drive. On the other hand, where the speed reducer is to be used under such circumstances that it never has to be slipped by manual operation and always turns in the same direction, it is advantageous to locate the springs so that the contact of the disc 14 with the cup 24 will take place at a point not far removed from 180° from the pin 9. This will result in a very strong wedging action in one direction of drive and comparatively light spring will permit a drive that will not slip from under fairly heavy loads and in cases where heavy loads are encountered, and no slippage is desired, such modification is of advantage. In general, the present invention is not limited to a design in which the disc 14 encounters the periphery of cup 24 at any particular point.

Figs. 8A-E show in diagrammatic form a cycle of rotation. The position of the pin 9 is shown on the diagram in dotted lines, the springs 12 have forced the disc 14 into contact with the cup 24 at the point shown. As the disc 6 rotates a quarter of a revolution to the position shown in Fig. 8B, the point of contact between the disc 14 and the cup 24 has shifted and hence the rotation of the disc 24 is the small arc shown between the arrows at the left and amounts to the difference in periphery between the cup 24 and the disc 14. Fig. 8C shows the conditions after a second quarter of a revolution, 8D the position after a third quarter of a revolution, and 8E after one revolution has been completed.

It will be noticed that the disc 14 and the cup 24 are always in rolling contact but no slippage results because the springs 12 press the disc 14 and cup 24 together along their line of contact. A high degree of reduction is obtained without any backlash whatsoever. Also, since the members of the drive are in rolling contact, friction loss is reduced to a minimum.

The above description illustrates the operation of the speed reducer as such. In addition, in the case of a flickering beam spectrophotometer such as is shown in Fig. 1, it is sometimes desirable to provide for a cam changing means in the housing 2, and for this purpose the shaft 17 can be moved axially to bring successively different cams in contact with the push rod 3. This is possible as the disc 6 can move along the shaft 5 for a reasonable distance because of the fact that the arm 17 can pivot about the pin 20. Where provision for small axial movement is not necessary, this second degree of motion of the arm 17 may be eliminated and its suspension at the end can be somewhat simplified. In the present invention the cam shifting device for a spectrophotometer is not claimed as this forms the subject matter of my copending application Serial No. 441,029, filed April 29, 1942. Its structural details form no part of the present invention.

It will be noted that a double reduction is effected, first the reduction from the shaft 5 to the disc 6, and secondly the reduction in speed between the disc 6 and the cup 24. Where as great a speed reduction is not necessary or desired, the disc 6 may be driven directly or if desired a plurality of reduction drives as shown in the present invention may be arranged in series. In other words, shaft 7 can drive the driving disc of a second speed reducer. In this manner enormous reductions can be obtained without backlash and with relatively simple constructions.

It is a further advantage of the present invention that it may be applied not only to drives requiring but little power such as the spectrophotometer drives in connection with which it has been specifically described, but it may also be used where greater amounts of power are necessary. It is in the former drives, however, that its greatest utility is achieved because drives which are to transmit high torque can be arranged so there is less backlash than in drives where the torque transmitted is relatively small. However, the application of the speed reducer of the present invention is not intended to be limited to any particular class of devices.

Essentially the arm 17 and its attachment to the disc 14 is a device which will permit small movements of the center of the disc in circular or elliptical paths but will prevent rotation. A pivot arm, particularly where the length of the arm is large in comparison with the amount of movement of the center of the disc, represents a very simple structure, particularly for drives where small torque is to be transmitted. It should be understood, however, that any other means which will restrict the degree of motion of disc 14 may be used.

I claim:

1. A speed reducer comprising a cup-shaped driven member keyed to a driven shaft, said member having a cylindrical inner surface, a circular driving member having its center of rotation coincident with the driven shaft, two disc members the first one being positioned within the cup-shaped driven member and having a circumference somewhat smaller than the internal diameter of the driven member, said disc being provided with a central hollow hub, the second disc being journaled on said hub and being pivoted on a pin adjacent to the periphery of the driving member, spring means connecting the second disc and the driving member at a point to cause the second disc to tend to turn about the pin as a pivot, and means associated with the first disc to permit gyrations thereof of limited extent of the plane thereof but preventing it from rotation.

2. A speed reducer comprising a cup-shaped driven member rigidly attached to a driven shaft, said member having a cylindrical inner surface, a circular driving member having its center of rotation coincident with the driven shaft, two disc members, the first one being positioned within the cup-shaped driven member and having a circumference somewhat smaller than the internal diameter of the driven member, said disc being provided with a central hollow hub, the second disc being journaled on said hub and being pivoted on a pin adjacent to the periphery of the driving member, spring means connecting the second disc and the driving member at a point to cause the second disc to tend to turn about the pin as a pivot, the first disc being provided with two oppositely positioned lugs on its periphery extending beyond the cup-shaped driven member and ending in pins parallel to the plane of the disc, a member forked at one end of great length in comparison to the diameter of the first disc pivoted on said pins and extending in a plane substantially parallel to the plane of the disc, the other end being pivoted so that the forked end is capable of limited movement both parallel to the plane of the first disc and at right angles thereto, a driving motor having elongated shaft parallel to the driven shaft of the speed reducer and in frictional contact with the periphery of the circular driving member, the elements of the speed reducer with the exception of the unforked end of the forked element being capable of limited axial movement.

ORRIN WESTON PINEO.